United States Patent
Sun et al.

(10) Patent No.: US 12,016,083 B1
(45) Date of Patent: Jun. 18, 2024

(54) DYNAMICALLY ESTABLISHING RELAY VOICE-BEARER IN RESPONSE TO DETECTING OF VOICE COMMUNICATION ON OTHER RELAY BEARER

(71) Applicant: T-Mobile USA, Inc., Bellevue, WA (US)

(72) Inventors: David Z. Sun, Broadlands, VA (US); Zheng Fang, Mclean, VA (US); Zheng Cai, Fairfax, VA (US); Yu Wang, Fairfax, VA (US); Amrit K. Chandra, Ashburn, VA (US)

(73) Assignee: SPRINT SPECTRUM LLC, Bellevue, WA (US)

( * ) Notice: Subject to any disclaimer, the term of this patent is extended or adjusted under 35 U.S.C. 154(b) by 406 days.

(21) Appl. No.: 16/916,858

(22) Filed: Jun. 30, 2020

(51) Int. Cl.
| | |
|---|---|
| H04W 88/04 | (2009.01) |
| H04B 7/26 | (2006.01) |
| H04W 24/02 | (2009.01) |
| H04W 28/02 | (2009.01) |
| H04W 76/12 | (2018.01) |
| H04W 84/04 | (2009.01) |
| H04W 88/16 | (2009.01) |

(52) U.S. Cl.
CPC .......... *H04W 88/04* (2013.01); *H04B 7/2606* (2013.01); *H04W 24/02* (2013.01); *H04W 28/0268* (2013.01); *H04W 76/12* (2018.02); *H04W 84/047* (2013.01); *H04W 88/16* (2013.01)

(58) Field of Classification Search
CPC ..................................................... H04W 88/04
See application file for complete search history.

(56) References Cited

U.S. PATENT DOCUMENTS

| | | | |
|---|---|---|---|
| 6,683,853 B1 | 1/2004 | Kannas et al. | |
| 8,817,690 B2 * | 8/2014 | Huang ............... | H04W 72/0486 370/315 |
| 8,902,805 B2 * | 12/2014 | Ulupinar ............... | H04W 40/22 370/315 |

(Continued)

FOREIGN PATENT DOCUMENTS

| | | |
|---|---|---|
| EP | 2 903 304 | 8/2015 |
| WO | WO 2013/123467 | 8/2013 |

(Continued)

*Primary Examiner* — Guang W Li
(74) *Attorney, Agent, or Firm* — Lee & Hayes P.C.

(57) ABSTRACT

A method and system for controlling bearer establishment in a wireless communication system in which a donor base station serves a relay over a first air interface and in which the relay is configured to serve UEs over a second air interface. An example method includes (i) detecting a flow of voice traffic on a relay-bearer communication path that extends between the relay and a gateway system via the donor base station, where the voice traffic is digitized voice data being communicated in a VoIP call of a UE served by the relay and (ii) responsive to at least the detecting of the flow of the voice traffic over the relay-bearer communication path, triggering dynamic establishment for the relay of a dedicated VoIP relay bearer that extends between the relay and the gateway system via the donor base station, for carrying the continued voice traffic of the UE's VoIP call.

20 Claims, 4 Drawing Sheets

(56) References Cited

U.S. PATENT DOCUMENTS

| | | | |
|---|---|---|---|
| 8,989,124 B1* | 3/2015 | Ramamurthy | H04W 76/12 370/329 |
| 9,560,660 B1 | 1/2017 | Oroskar et al. | |
| 9,743,312 B1 | 8/2017 | Malhotra et al. | |
| 9,860,786 B1* | 1/2018 | Wang | H04W 28/06 |
| 10,327,267 B1* | 6/2019 | Malhotra | H04L 65/80 |
| 10,433,203 B1* | 10/2019 | Kothari | H04W 16/32 |
| 10,555,357 B1* | 2/2020 | Sharma | H04W 40/22 |
| 11,139,884 B1* | 10/2021 | Singh | H04B 7/15507 |
| 2004/0071086 A1 | 4/2004 | Haumont et al. | |
| 2004/0106405 A1 | 6/2004 | Gabriel et al. | |
| 2010/0046418 A1* | 2/2010 | Horn | H04W 40/22 370/315 |
| 2010/0260129 A1* | 10/2010 | Ulupinar | H04L 12/4633 370/329 |
| 2010/0318670 A1 | 12/2010 | Al-Shalash et al. | |
| 2011/0002326 A1* | 1/2011 | Hwang | H04L 12/66 370/352 |
| 2011/0103294 A1 | 5/2011 | Liu | |
| 2011/0223918 A1 | 9/2011 | Dahlen et al. | |
| 2012/0236782 A1* | 9/2012 | Bucknell | H04W 72/1221 370/315 |
| 2012/0250509 A1 | 10/2012 | Leung | |
| 2012/0287790 A1* | 11/2012 | Huang | H04W 28/10 370/236 |
| 2013/0051332 A1 | 2/2013 | Sridhar | |
| 2013/0272197 A1 | 10/2013 | Avila Gonzalez et al. | |
| 2013/0301558 A1* | 11/2013 | Zakrzewski | H04W 28/0215 370/329 |
| 2013/0329559 A1 | 12/2013 | Cabrera | |
| 2014/0024383 A1 | 1/2014 | Rahman et al. | |
| 2014/0086052 A1 | 3/2014 | Cai et al. | |
| 2014/0219083 A1 | 8/2014 | Mandyam et al. | |
| 2014/0302853 A1* | 10/2014 | Militano | H04W 36/0079 455/436 |
| 2014/0347996 A1 | 11/2014 | Rahman et al. | |
| 2015/0009826 A1* | 1/2015 | Ma | H04W 72/569 370/235 |
| 2015/0016334 A1* | 1/2015 | Byun | H04W 36/08 370/315 |
| 2015/0045032 A1 | 2/2015 | Tomici | |
| 2015/0085660 A1 | 3/2015 | Harris et al. | |
| 2015/0098325 A1 | 4/2015 | Lu et al. | |
| 2016/0183119 A1 | 6/2016 | Tjandra et al. | |
| 2016/0212668 A1* | 7/2016 | Castro Castro | H04W 36/26 |
| 2016/0226922 A1 | 8/2016 | Russell et al. | |
| 2016/0381620 A1 | 12/2016 | Panaitopol et al. | |
| 2017/0048877 A1 | 2/2017 | Wang | |
| 2017/0201902 A1 | 6/2017 | Chen et al. | |
| 2017/0265119 A1* | 9/2017 | Fang | H04W 8/26 |
| 2017/0367139 A1 | 12/2017 | Jang et al. | |
| 2018/0234524 A1 | 8/2018 | Cheng et al. | |
| 2019/0090157 A1* | 3/2019 | Yoshimura | H04W 28/18 |
| 2020/0045614 A1* | 2/2020 | Ha | H04W 28/0289 |

FOREIGN PATENT DOCUMENTS

| | | | | |
|---|---|---|---|---|
| WO | WO 2016/059063 | | 4/2016 | |
| WO | WO-2016059063 A1 | * | 4/2016 | H04B 7/15507 |

* cited by examiner

DYNAMICALLY ESTABLISHING RELAY VOICE-BEARER IN RESPONSE TO DETECTING OF VOICE COMMUNICATION ON OTHER RELAY BEARER

BACKGROUND

A typical wireless communication system includes one or more base stations, each radiating to define one or more coverage areas, such as cells and cell sectors, in which user equipment devices (UEs) such as cell phones, tablet computers, tracking devices, embedded wireless modules, and other wirelessly equipped communication devices (whether or not user operated), can operate. Further, each base station could be coupled with a core network that provides connectivity with various application servers and/or transport networks, such as the public switched telephone network (PSTN) and/or the Internet for instance. With this arrangement, a UE within coverage of the system may thus engage in air interface communication with a base station and thereby communicate via the base station with various remote network entities or with other UEs served by the system.

In general, a wireless communication system may operate in accordance with a particular radio access technology (RAT), with communications from a base station to UEs defining a downlink or forward link and communications from the UEs to the base station defining an uplink or reverse link.

Over the years, the industry has developed various generations of RATs, in a continuous effort to increase available data rate and quality of service for end users. These generations have ranged from "1G," which used simple analog frequency modulation to facilitate basic voice-call service, to "4G"— such as Long Term Evolution (LTE), which now facilitates mobile broadband service using technologies such as orthogonal frequency division multiplexing (OFDM) and multiple input multiple output (MIMO). And recently, the industry has been exploring developments in "5G" and particularly "5G NR" (5G New Radio), which may use a scalable OFDM air interface, advanced channel coding, massive MIMO, beamforming, and/or other features, to support higher data rates and countless applications, such as mission-critical services, enhanced mobile broadband, and massive Internet of Things (IoT).

In accordance with the RAT, each base station could provide coverage on one or more carriers, each of which could be frequency division duplex (FDD), defining separate frequency channels for downlink and uplink communication, or time division duplex (TDD), with a single frequency channel multiplexed over time between downlink and uplink use. And on the downlink and uplink channels, the air interface on each carrier could be configured in a specific manner to define physical resources for carrying information wirelessly between the base station and UEs.

In an example implementation, the air interface on each carrier could be divided over time into frames, subframes, and symbol time segments, and over frequency into subcarriers that could be modulated to carry data. The example air interface could thus define an array of time-frequency resource elements each at a respective symbol time segment and subcarrier, and the subcarrier of each resource element could be modulated to carry data. Further, in each subframe or other transmission time interval, the resource elements on the downlink and uplink of the example air interface could be grouped to define physical resource blocks (PRBs) that could be allocated as needed to carry data between the base station and served UEs.

In addition, certain resource elements on the example air interface could be reserved for special purposes. For instance, on the downlink, certain resource elements could be reserved to carry synchronization signals that indicate the presence of coverage on the carrier, and still other resource elements could be reserved to carry a reference signal that UEs could measure in order to determine coverage strength.

OVERVIEW

In example operation, when a UE enters into coverage of such a network, the UE could initially scan for and detect threshold strong coverage of a base station on a carrier, and the UE could responsively engage in signaling with the base station to establish a Radio Resource Control (RRC) connection or the like between the UE and the base station. Further, the UE could engage in attach signaling via the base station with a core-network controller, to attach and thus register for service.

Upon initial attachment and/or at other times when serving a UE, the network could coordinate setup for the UE of one or more user-plane bearers, each defining a logical packet flow for packet-data communications between the UE and a core-network gateway system that provides connectivity with a packet data network. For instance, after authenticating and authorizing the UE, the core-network controller could engage in signaling with the base station and with the gateway system, to coordinate setup of each such bearer, including a radio portion extending between the UE and the base station and an access portion extending between the base station and the gateway system.

Each such bearer could support communication between the UE and the gateway system and thus ultimately between the UE and the packet data network with which the gateway system provides connectivity. Thus, when data on the network arrives at the gateway system for transmission to the UE, the data could flow over a bearer from the gateway system to the base station and from the base station to the UE. And when the UE has data to transmit on the packet data network, the data could flow over a bearer from the UE to base station and from the base station to the gateway system for output onto the packet data network.

Further, for the air-interface portion of each such transmission, the base station could coordinate allocation of air-interface resources to carry the data. With the example air-interface configuration noted above, for instance when the base station has data to transmit to the UE, the base station could allocate one or more downlink PRBs in an upcoming subframe for carrying a block of the data to the UE and could then transmit the data to the UE in the allocated PRB(s). And when the UE has data to transmit to the base station, the base station could allocate one or more uplink PRB(s) in an upcoming subframe for carrying a block of the data to the base station, and the UE could then transmit the data to the base station in the allocated PRB(s).

In a representative system, each bearer that is established for the UE could have a corresponding defined quality-of-service (QoS) service level, which could be indicated by one or more bearer attributes stored in context records for the UE at entities along the bearer path, such as at the UE, the base station, and the gateway system. For instance, each bearer could be associated with a particular QoS Class Identifier (QCI) and/or Differential Services Point Code (DSCP) value that defines various QoS attributes of the bearer, such as packet-delay budget, acceptable packet-loss rate, minimum or maximum bit rate, and the like. Entities along the bearer communication path could then work to handle communications on the bearer accordingly.

Further, a bearer could be guaranteed-bit-rate (GBR) (e.g., QCIs 1-4) or non-GBR (e.g., QCIs 5-9). GBR bearers are used for real-time services such as voice, video, and real-time gaming, and would have a guaranteed minimum bit rate that entities along the bearer communication path could work to satisfy in order to facilitate the communication. As such, setting up a GBR bearer for a UE could require the base station to proactively reserve air-interface resources, to help ensure that sufficient resources will exist to support communication at the bearer's QoS level. Whereas, non-GBR bearers are used for non-real-time services, such as web browsing, file transfer, and email communication, having no guaranteed minimum bit rate.

In addition, a bearer could be default (non-dedicated) or dedicated. A default bearer is established for a UE at the time of attachment and remains in place for as long as the UE is attached, to provide the UE with always-on packet-data-network connectivity. And a default bearer is non-GBR and generally receives best-efforts service. Whereas, a dedicated bearer is established for a UE on an as-needed basis to carry a specific type of communication service such as one of the real-time services noted above, typically in association with a given default bearer. As such, a dedicated bearer could be configured with a traffic flow template (TFT) to give special treatment to the specific type of service and could be GBR or non-GBR.

When a UE first attaches, the network could thus initially configure for the UE one or more default bearers, depending on UE configuration and capability. For instance, the network could initially configure for the UE of a default bearer with QCI 8 or 9 to carry general Internet communications such as those noted above. Further, to enable voice-over-Internet-Protocol (VoIP) service hosted by an Internet Multimedia System (IMS), the network may also initially configure for the UE a default bearer with QCI 5 to carry VoIP-call setup and management signaling (e.g., Session Initiation Protocol (SIP) signaling) between the UE and the IMS. For each such default bearer, the gateway system or an associated server could also assign to the UE a respective Internet Protocol (IP) address for use by the UE to engage in packet data communication on the network to which the gateway system provides connectivity.

When appropriate during service of the UE, the network could then also configure for the UE a dedicated bearer associated with a particular default bearer. For instance, if and when the UE engages in VoIP-call-setup signaling over its default IMS-signaling bearer to set up an incoming or outgoing VoIP call, the network could responsively configure for the UE a dedicated VoIP bearer with QCI 1 for carrying packetized voice communications of the call. The UE could then engage in the VoIP call, transmitting and receiving packetized voice communications over that QCI-1 VoIP bearer and could engage in further VoIP-call-related signaling over its QCI-5 IMS-signaling bearer if and when necessary.

Optimally, a wireless service provider will strategically implement base stations throughout a market area so that served UEs can move between the base stations' coverage areas without loss of coverage. Each base station could include an antenna structure and associated equipment, and the wireless service provider could connect the base station by a landline cable (e.g., fiber backhaul) with the service provider's core network, to enable the base station to communicate with the core-network controller, the gateway system, other base stations, and the like.

In certain locations, however, it may be impractical for a wireless service provider to run landline connections to base stations in certain locations. For instance, where a service provider seeks to provide many small coverage areas blanketing a market area or to fill in coverage holes between coverage of other base stations, the service provider may implement many small-cell base stations throughout the market area, but it may be inefficient, impossible, or undesirable to run landline cables to every one of those small-cell base stations.

To connect a base station with the core network in such a situation, the wireless service provider could implement a wireless relay backhaul connection in which the base station includes or is interconnected with a special UE that is served by a base station already connected with the core network. With this arrangement, the existing core-network-connected base station is referred to as a "donor base station," the special UE is referred to as a "relay-UE" (or "UE-relay"), and the base station at issue is referred to as a "relay base station." In operation, the donor base station then serves the relay-UE in much the same way as any base station would serve a UE, the relay-UE interfaces with the relay base station, operating as an intermediary between the relay base station and the donor base station, and the relay base station serves other UEs in much the same way as any base station would. Cooperatively, the relay base station and relay-UE in this arrangement could be considered a "relay" or "relay node."

To enable the relay base station in this arrangement to communicate with other entities in or via the core network (such as with the network controller, the gateway system, and other base stations), the service provider could implement a relay-gateway system or the like within the core network and could establish for the relay-UE one more bearers each extending between the relay-UE and the relay-gateway system via the donor base station. In practice, the relay-gateway system could be integrated with the conventional-gateway system discussed above but could serve to provide internal core network connectivity rather than external transport network connectivity.

In particular, when the relay-UE is put into service and sends an attach request to the donor base station, the relay-UE could include a special identifier indicating that the relay-UE is a relay-UE rather than a conventional end-user UE. And upon receipt of that attach request, the core-network controller could determine from that identifier or in another manner that the relay-UE is a relay-UE as opposed to an end-user UE and, in response, could coordinate, trigger, or facilitate setup of one or more bearers between the relay-UE and the internal relay-gateway system rather than between the relay-UE and the conventional-gateway system. Further, the relay-gateway system or an associated server could assign an IP address to the relay-UE, for use by the relay-UE to communicate within the core network. And the relay-gateway system could assign an IP address to the relay base station, for use by the relay base station to communicate within the core network.

With this arrangement in place, the relay base station could then engage in communication with other core network entities (e.g., with the network controller, the conventional-gateway system, and other base stations) as any other base station would do. However, the communication could pass via the wireless relay backhaul connection and the relay-gateway system. In particular, the communication could pass via (i) the connection or integration between the relay base station and the relay-UE and (ii) one of the relay-UE's bearers via the donor base station, with the donor base station coordinating air interface transmission between the relay-UE and the donor base station in much the same way as discussed above.

Accordingly, with this arrangement, when an end-user UE is served by the relay base station and the system establishes for the UE one or more bearers, each such bearer would extend between the UE and the conventional core-network gateway system as discussed above but would pass through a relay-UE bearer including the relay-UE's air interface connection with the donor base station and including the relay-gateway system.

Thus, when the conventional-gateway system receives data destined to such an end-user UE, in order for the gateway system to transmit the data over an appropriate bearer to the UE's serving relay base station, the conventional-gateway system would transmit the data to the relay-gateway system, the relay-gateway system would transmit the data to the donor base station, the donor base station would coordinate air interface transmission of the data to the relay-UE, and the relay-UE would pass the data to the relay base station for transmission to the UE. And likewise, when the relay base station receives data transmitted from the end-user UE for output on the packet data network, the relay base station would pass the data to the relay-UE, the donor base station would coordinate air interface transmission of the data from the relay-UE to the donor base station, the donor base station would pass the data to the relay-gateway system, and the relay-gateway system would pass the data to the conventional-gateway system for output on the packet data network.

In a system that supports VoIP call service, the network controller could initially establish for such a relay-UE a QCI 1 bearer for use to carry voice traffic that would be communicated to/from any end-user UEs that would be served by the associated relay base station and that might engage in VoIP calls. This QCI 1 bearer could be established in advance for the relay-UE, so that the bearer would be in place for carrying VoIP call traffic if and when any UE served by the associated relay base station engages in a VoIP call.

In establishing this QCI 1 bearer for the relay-UE, because the bearer is a GBR bearer having a high QoS level, the donor base station could reserve air-interface resources as discussed above to accommodate the bearer's QoS level. For instance, considering the relay-UE's channel conditions and other factors that may impact the modulation and coding scheme used for air-interface communication with the relay-UE, and considering the guaranteed bit rate and/or maximum bit rate for VoIP traffic on the QCI-1 bearer, the donor base station could proactively reserve some number of PRBs per unit time to be available for carrying the packetized voice traffic on the bearer. That way, if and when an end-user UE served by the relay base station engages in a VoIP call over a QCI-1 bearer established between the end-user UE and the conventional-gateway system, the packetized voice communication of that VoIP call could flow through the relay-UE's QCI-1 bearer and could thus receive appropriate QoS treatment between the relay-UE and the relay-gateway system.

Unfortunately, a technological problem that can arise in this arrangement is that setting up the QCI-1 bearer for the relay-UE before a VoIP call is actually underway through the relay would unnecessarily consume some of the donor base station's air-interface resources, which could pose issues for other communications served by the donor base station.

With the example air-interface configuration noted above, for instance, the carrier (or carriers) on which donor base station serves the relay-UE would have a limited number of PRBs based on the carrier's bandwidth. If the donor base station proactively sets aside some of those PRBs per unit time to be able to accommodate a QCI-1 bearer established for the relay-UE even when no VoIP call is underway through that QCI-1 bearer, then those PRBs may be unavailable for use to carry other communications. Especially at times of heavy load, this PRB reservation could make it difficult for the donor base station to serve other communications (such as high-throughput and/or latency-sensitive communications) with a desired level of quality, and the reserved PRBs would go unused.

The present disclosure provides a mechanism to help address this issue. In accordance with the disclosure, when a donor base station is serving a relay over an air-interface connection between the donor base station and relay and the relay is not serving a VoIP call, the donor base station will operate with a default bearer set up for the relay and without a dedicated VoIP bearer set up for the relay. When a UE served by the relay then engages in a VoIP call and packetized voice traffic of the VoIP call flows over the default bearer set up for the relay, an entity in a communication path of the VoIP call will detect the flow of that packetized voice traffic and will responsively engage in signaling to trigger dynamic setup for the relay of a dedicated VoIP bearer. As the UE's VoIP call continues, the packetized voice traffic of the VoIP call will then flow over that newly set up dedicated VoIP bearer.

Note that, in the example implementation, this process involves dynamically setting up a new dedicated VoIP bearer for the relay, extending between the relay and the relay-gateway system, to accommodate VoIP-call communication of an end-user UE served by the relay. This is therefore distinct from merely changing a QoS level of an existing bearer. And this is distinct from setting up a dedicated VoIP bearer for the end-user UE, extending between the end-user UE and the conventional-gateway system, to accommodate that VoIP-call communication. Here, the relay-UE component of the relay is not itself engaged in the VoIP call, but the dedicated VoIP bearer dynamically established for the relay serves a conduit for packetized voice communication to/from the end-user UE served by the relay.

Optimally, by waiting to set up a dedicated VoIP bearer for the relay until the end-user UE's voice traffic is actually flowing through the relay, the donor base station can avoid proactively reserving air-interface resources to accommodate a VoIP call that may not occur and may thereby help to avoid unduly restricting resource availability as noted above.

These as well as other aspects, advantages, and alternatives will become apparent to those of ordinary skill in the art by reading the following detailed description, with reference where appropriate to the accompanying drawings. Further, it should be understood that the descriptions provided in this overview and below are intended to illustrate the invention by way of example only and not by way of limitation.

DETAILED DESCRIPTION

The present disclosure will focus on application in the context of 4G LTE or 5G NR as an example RAT and associated network arrangement, and specifically to application with respect to a QCI-1 dedicated VoLTE bearer as noted above. However, it will be understood that principles of the disclosure can extend to apply in other scenarios as well, such as with respect to other RATs and with respect to other bearers. Further, even within the context presented, variations from the details disclosed may be possible. For instance, elements, arrangements, and functions may be added, removed, combined, distributed, or otherwise modified. In addition, it will be understood that functions described as being performed by one or more entities may be implemented in various ways, such as by a processing unit executing software instructions for instance.

Figure 1:
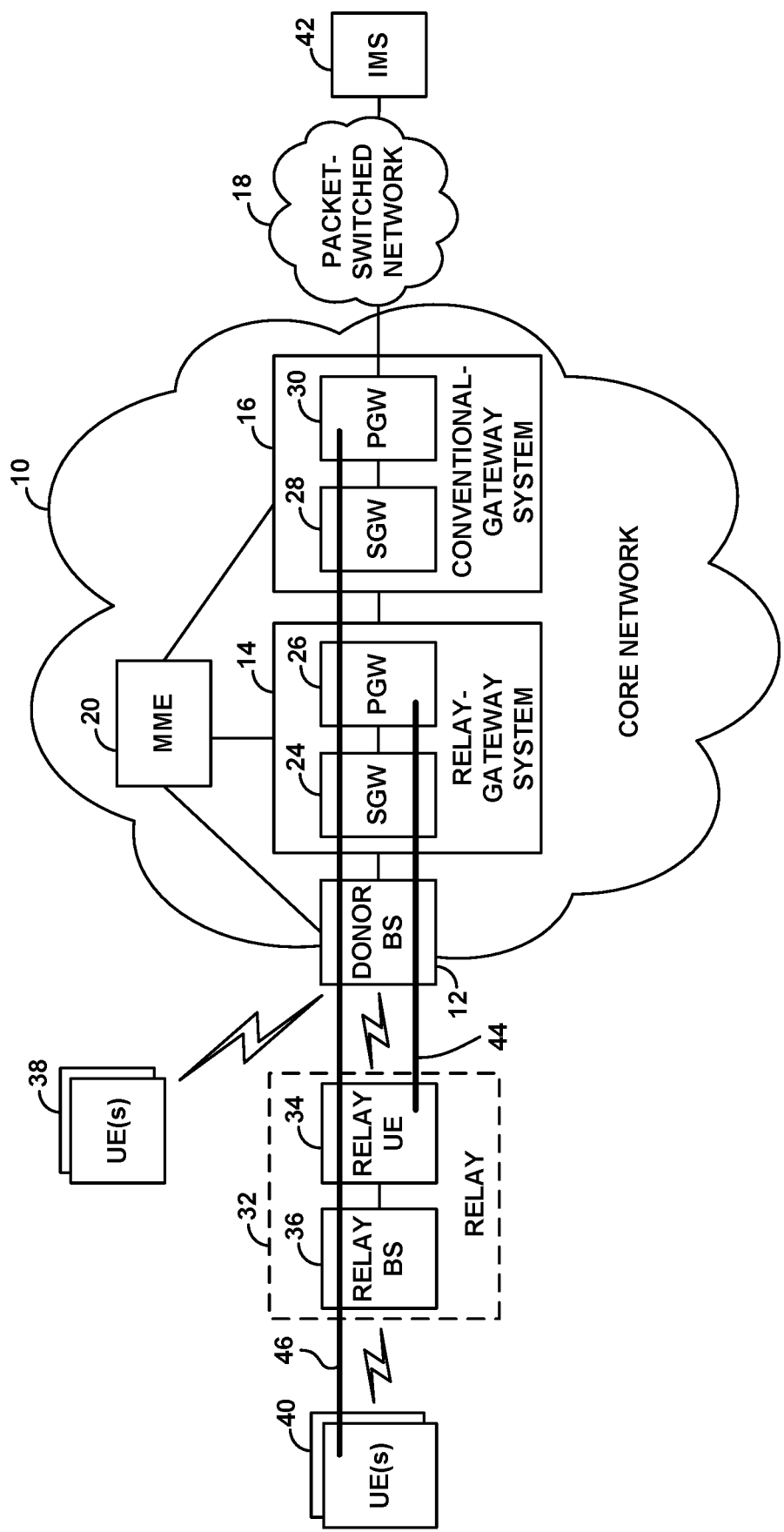
FIG. 1 is a simplified block diagram of an example wireless communication system in which features of the present disclosure can be implemented.

Referring to the drawings, as noted above, FIG. 1 is a simplified block diagram of a wireless communication system in which features of the present disclosure can be implemented. In particular, FIG. 1 depicts a representative core network 10, which functions primarily to serve UEs with wireless packet data communication service, including possibly VoIP (e.g., voice over LTE (VoLTE) or voice over NR (VoNR)) service, but may also provide other functions. The core network 10 could be a packet-switched network compliant with the industry standard system architecture evolution (SAE), by way of example, and thus the entities shown on the core network could each have an IP address and be configured to communicate with each other over packet-based tunnels or other communication interfaces.

Network 10 includes or is interconnected with an example donor base station (BS) 12, which would have an antenna structure and associated equipment (not shown) for providing coverage in which to serve the UEs. In particular, the donor base station could provide coverage on a representative carrier that is configured as discussed above to have a finite extent of resource elements and PRBs per unit time for carrying communications between the donor base station and its served UEs. The donor base station 12 then has communication interfaces with an example relay-gateway system 14 and an example conventional-gateway system 16 (not fully illustrated in the figure).

The relay-gateway system 14 provides connectivity into the core network 10, to facilitate communication with other entities such as (i) the conventional-gateway 16, (ii) a mobility management entity (MME) 20 that functions as a core-network controller, and (iii) other base stations. The relay-gateway system 14 is shown by way of example including a serving gateway (SGW) 24 and a packet-data network gateway (PGW) 26. In practice, the SGW 24 may have interfaces with the donor base station, the PGW 26, and the MME 20, and the PGW 26 may function as a gateway generally into the core network 10, to facilitate communication with the other core network entities.

The conventional-gateway system, on the other hand, provides connectivity with packet-switched transport network 18, to facilitate communication on that network. Similar to the relay-gateway system, the conventional-gateway 16 is shown by way of example including an SGW 28 and a PGW 30. And in practice, the SGW 28 may have interfaces with base stations, the MME 20, and the PGW 30, and the PGW 30 may function as a gateway into the packet-switched network 18, to facilitate communication on that network.

As noted above, the relay-gateway system 14 and conventional-gateway system 16 could be integrated together but could serve these different purposes, with the relay-gateway system 14 providing for internal core-network communication and the conventional-gateway system 16 providing for external transport network communication. In an SAE network, the relay-gateway system could also be referred to as a relay-SAEGW or infrastructure-SAEGW, and the conventional-gateway system could be referred to as an SAEGW or UE-SAEGW.

FIG. 1 additionally shows, within coverage of the donor base station 12, a representative relay 32 including a relay-UE 34 and a relay base station 36. The relay-UE 34 could be a conventional or specially configured UE that is in place to provide wireless backhaul connectivity for at least relay base station 36. Further, the figure also shows within coverage of donor base station 12 one or more non-relay UEs 38. With this arrangement, the donor base station 12 could serve both the relay-UE 34 and the end-user UEs 38 on a common air interface, and the relay-UE 34 could function as an intermediary between the donor base station 12 and the relay base station 36, thus providing the relay base station 36 with wireless backhaul connectivity to the core network 10.

In addition, FIG. 1 depicts a representative IMS platform 42, which could be accessible via the transport network 18 or more directly via the core network 10. The IMS platform 42, which could comprise a number of nodes (not shown), operates to support real-time packet-based media communication, such as VoIP call communication. For instance, the IMS platform 42 could engage in SIP signaling with a UE to set up a VoIP call and could responsively engage in control signaling with the core network 10 to trigger setup for the UE of a QCI 1 bearer for carrying the associated voice call traffic between that UE and network 18, so as to facilitate VoIP call communication between the UE and the IMS platform 42. And the IMS platform 42 could operate to bridge that VoIP call communication with a remote call party.

As discussed above, when the relay-UE 34 is put into service, the relay-UE 34 could detect sufficient coverage of the donor base station 12 and could responsively establish a radio-link-layer connection with the donor base station 12 and engage an attach process with the network.

Through this attach process, the MME 20 might coordinate establishment for the relay-UE 34 of several bearers or "relay bearers," with each relay bearer extending between the relay-UE 34 and the relay-gateway system 14 as shown by bold line 44 in FIG. 1, to accommodate expected communication that will flow between the relay-UE 34 and various core network entities, including communications to/from the relay base station 36 and communications to/from UEs 40 served by the relay base station 36. For instance, the MME 20 could coordinate setup for the relay-UE 34 of a QCI-6 general-purpose relay bearer for carrying generally any such communication traffic. Further, the MME 20 could coordinate setup for the relay-UE 34 of a QCI-5 IMS signaling relay bearer for carrying IMS signaling traffic that flows between the served UEs 40 and the IMS 42. And the MME 20 could coordinate setup for the relay-UE 34 of a QCI-1 VoIP relay bearer for carrying packetized voice traffic between the UEs 40 and the IMS 42.

To set up each such relay bearer, for example, the MME 20 could engage in signaling with the donor base station 12 and the SGW 24 of the relay-gateway system 14, to coordinate setup between the donor base station 12 and the SGW 24 of an S1-U tunnel portion of the relay bearer. And the donor base station 12 could responsively engage in signaling with the relay-UE 34 to set up between the donor base station 12 and the relay-UE 34 an air-interface (e.g., data radio bearer (DRB)) portion of the relay bearer, and the SGW 24 could responsively engage in signaling with the PGW 26 to set up between the SGW 24 and the PGW 26 an S5-tunnel portion of the relay bearer.

For each relay bearer, this process could thus result in setup of a respective bearer tunnel 44 that extends between the relay-UE 34 and the PGW 26 via the donor base station 12, the S1 tunnel, the SGW 24, and the S5 tunnel. Further, through this process for each such relay bearer, the MME 20 could specify (e.g., to both the donor base station 12 and the relay-gateway system 14) QoS attributes of the bearer, such as the bearer's QCI level and/or associated DSCP level and any other specifics, and entities along the relay-bearer communication path could store in a context record for the relay-UE an identity of the relay bearer and a record of the bearer's QoS attributes, so as to facilitate handling traffic on the bearer in accordance with the bearer's respective QoS level.

Further in line with the discussion above, when each of one or more end-user UEs 40 enters into coverage of the relay base station 36, the end-user UE 40 could detect sufficient coverage of the relay base station 36 and could responsively establish a radio-link-layer connection with the relay base station 36 and engage an attach process with the network.

Through this attach process, the MME 20 might likewise coordinate establishment for the end-user UE 40 of several bearers, but with each bearer conventionally extending between the end-user UE 40 and the conventional-gateway system 16 as shown by other bold line 46 in FIG. 1, to accommodate expected communication that will flow between the end-user UE and the external transport network 18. For instance, the MME 20 could coordinate setup for the end-user UE 40 of a QCI-9 best-efforts bearer for general Internet communications. And the MME 20 could coordinate setup for the end-user UE 40 of a QCI-5 IMS signaling bearer for carrying IMS signaling traffic that flows between the end-user UE 40 and the IMS 42.

To set up each such bearer for the end-user UE 40, the MME 20 could engage in signaling with the relay base station 36 (via the relay-gateway system 14, donor base station 12, and wireless relay backhaul connection between the relay-UE 34 and the donor base station 12) and SGW 28 of the conventional-gateway system 16, to coordinate setup between the relay base station 36 and the SGW 28 of an S1-U tunnel portion of the bearer. And the relay base station 36 could responsively engage in signaling with the end-user UE 40 to set up between the relay base station 36 and the end-user UE 40 an air-interface (e.g., data radio bearer (DRB)) portion of the bearer, and the SGW 28 could responsively engage in signaling with the PGW 30 to set up between the SGW 28 and the PGW 30 an S5-tunnel portion of the bearer.

In practice with this arrangement, as UEs 40 served by the relay base station 36 place and receive VoIP calls, the network could establish for those UEs associated QCI-1 VoIP bearers for carrying the associated voice call traffic between the UEs and the conventional-gateway system 16. In particular, when a UE 40 engages in SIP signaling with the IMS platform 42 to set up such a call, the IMS platform 42 could signal to the core network to trigger setup for the UE of a QCI-1 VoIP bearer for carrying the voice call traffic of the VoIP call. And as a result, the PGW 30 of the conventional-gateway system could signal to the SGW 28 of the conventional-gateway system, the SGW 28 could signal to the MME 20, and the MME 20 could coordinate setup of the QCI-1 VoIP bearer for the UE 40 in much the same way as noted above, extending between the end-user UE 40 and the conventional-gateway system 16.

As packetized voice traffic of such an end-user UE VoIP call passes over the end-user UE's QCI-1 VoIP bearer between the end-user UE 40 and the conventional-gateway system 16, the voice traffic would be routed over the relay-UE's QCI-1 VoIP relay bearer between the relay-UE 34 and the relay-gateway system 14.

To facilitate this in practice, such voice packets could be tagged in their headers with DSCP values or other information that indicates the packets are voice packets. For instance, each such voice packet could be tagged with DSCP value 46 to indicate that the packet is a voice packet.

For each such packet that the conventional-gateway system 16 sends over the end-user UE's QCI-1 VoIP bearer to the end-user UE 40, the relay-gateway system 14 and donor base station 12 could thus read that DSCP value to determine that the packet is a voice packet and, considering that a QCI-1 VoIP relay bearer exists between the PGW 26 and the relay-UE 34, the PGW 26, SGW 24, and donor base station 12 could accordingly route the packet over that QCI-1 relay VoIP bearer to the relay-UE 34. And the relay-UE 34 could forward the packet to the relay base station 36, which could coordinate air-interface transmission of the packet over the remainder of the end-user UE's QCI-1 VoIP bearer to the end-user UE 40.

Likewise, for each such packet that the end-user UE 40 sends over the end-user-UE's QCI-1 VoIP bearer to the conventional-gateway system 16, the relay base station 36 could coordinate air-interface transmission of the packet over the end-user UE's QCI-1 VoIP bearer to the relay base station 36, which could forward the packet to the relay-UE 34. Considering that a QCI-1 VoIP relay bearer exists between the relay-UE 34 and the PGW 26 of the relay-gateway system 14, the relay-UE 34 could accordingly work with the donor base station 12 to transmit the packet over that QCI-1 VoIP relay bearer to the donor base station 12, the packet could then flow along the remainder of QCI-1 VoIP relay bearer to the PGW 26 of the relay-gateway system 14, and from there the packet could flow along the remainder of the end-user UE's QCI-1 VoIP bearer to the PGW 30 of the conventional gateway system 16.

As noted above, the presently disclosed mechanism helps to addresses the problematic situation where the donor base station 12 proactively reserves resources for a QCI-1 VoIP relay bearer without the existence of any VoIP call whose voice traffic would flow over that relay bearer. Namely, as noted above, the donor base station 12 may proactively reserve air-interface resources or the like to be able to accommodate such a VoIP call by an end-user UE 40. But that resource reservation may be a waste if no such VoIP call occurs and at least at times when no such VoIP call occurs.

To help address this issue, as noted above, rather than having a dedicated VoIP relay bearer be proactively set up by default for the relay-UE 34 in anticipation of an end-user UE VoLTE call that may or may not occur, a dedicated VoIP relay bearer could be set up dynamically for the relay-UE 34 in response to detecting the flow of voice traffic between the relay-UE and the core network.

As a modification of the process described above, for instance, when the relay-UE 34 connects with the donor base station 12 and engages in an attach process with the network, the MME 20 could set up for the relay-UE 34 of just a default QCI-6 general-purpose relay bearer and a default QCI-5 IMS signaling relay bearer, but could forgo setting up for the relay-UE 34 a dedicated QCI-1 VoIP relay bearer.

If and when a VoIP call is then set up for an end-user UE 40 served by the relay base station 36 and a dedicated QCI-1 VoIP bearer is established between the end-user UE 40 and the conventional-gateway system 16, the voice packets of that VoIP call could flow over the relay-UE's default QCI-6 relay bearer.

For instance, for each such packet that the conventional-gateway system 16 sends over the end-user UE's QCI-1 VoIP bearer to the end-user UE 40, the relay-gateway system 14 and donor base station 12 could thus read the DSCP 46 tag in the packet's header to determine that the packet is a voice packet. And considering that a QCI-1 VoIP relay bearer does not exist between the PGW 26 and the relay-UE 34, the PGW 26, SGW 24, and donor base station 12 could route the packet over the relay-UE's default QCI-6 relay bearer to the relay-UE 34, for transmission in turn the rest of the way the end-user UE 40.

Likewise, each such packet that the end-user UE 40 sends over the end-user-UE's QCI-1 VoIP bearer to the conventional-gateway system 16 could flow to the relay-UE 34. And considering that a QCI-1 VoIP relay bearer does not exist between the relay-UE 34 and the PGW 26 of the relay-gateway system 14, the donor base station 12 could route the packet over the relay-UE's default QCI-6 bearer to the donor base station 12 and in turn to the SGW 24 and the PGW 26, from where the packet could then flow along the remainder of the end-user UE's QCI-1 VoIP bearer to the PGW 30 of the conventional-gateway system.

Meanwhile, an entity within or otherwise associated with the relay-UE's bearer communication path could detect this flow of voice traffic over the relay-UE's bearer communication path and, in response to detecting the flow of the voice traffic, could engage in signaling to dynamically trigger setup for the relay-UE 34 of a dedicated QCI-1 VoIP relay bearer over which continued voice traffic of the VoIP call could then flow.

As noted above, this detecting and signaling could be done by various entities. Without limitation, for instance, the detecting and signaling could be done by the relay-UE 34, the relay-gateway system 14 (e.g., the SGW 24 or the PGW 26), or by an S1 packet-sniffer or the like. Alternatively, the detecting and signaling could theoretically be done by the donor base station 12 if industry standards would allow it. Further, these or other operations could be carried out cooperatively by multiple entities.

Such an entity could detect in various ways that the data flowing over the relay-UE's bearer communication path is voice traffic. For instance, as a packet flows over that path, the entity could read and find that the packet has a Real-time Transport Protocol (RTP) header and/or one or more other such indicia that indicates the packet carries voice traffic. Alternatively or additionally (perhaps responsive to detecting that the packet has an RTP header), the entity could read and find in a packet header a DSCP 46 that indicates that the packet carries voice traffic.

In turn, in response to the detecting, the entity could engage in various signaling to trigger setup for the relay-UE 34 of a dedicated QCI-1 VoIP relay bearer.

By way of example, if the PGW 26 of the relay-gateway system 14 detects the voice-traffic flow, then the PGW 26 could responsively trigger network-initiated bearer setup of the dedicated QCI-1 VoIP relay bearer. For instance, the PGW 26 could transmit to the SGW 24 a create-bearer request that identifies the relay-UE 34 and requests setup of a dedicated QCI-1 VoIP relay bearer for the relay-UE 34, and the SGW 24 could responsively send a corresponding create-bearer request to the MME 20. The MME 20 could then transmit to the donor base station 12 a bearer setup request (e.g., an E-UTRAN Radio Access Bearer (E-RAB) setup request), which could trigger associated RRC signaling between the donor base station 12 and the relay-UE 34 and a response from the donor base station 12 to the MME 20. And response signaling could then propagate from the MME 20 to the SGW 24 and in turn to the PGW 26.

Alternatively, if the relay-UE 34 detects the voice traffic flow, then the relay-UE 34 could responsively trigger UE-initiated bearer setup of the dedicated QCI-1 VoIP relay bearer. For instance, the relay-UE 34 could transmit a network access stratum (NAS) signaling message via the donor base station 12 to the MME 20 to request setup of the dedicated QCI-1 VoIP relay bearer for the relay-UE 34, which could trigger associated signaling from the MME 20 to the SGW 24 and in turn to the PGW 26. And signaling could then proceed as with the network-initiated bearer setup process described above.

As part of setting up dedicated QCI-1 VoIP relay bearer in response to detecting the voice traffic flow over the relay-UE's bearer communication path, the donor base station 12 could then reserve resources for the QCI-1 VoIP relay bearer. For instance, the donor base station 12 could then set aside a certain number of PRBs per unit time on its air interface to be available for use to serve VoIP call communication. But optimally with the present process, this resource reservation by the donor base station 12 would occur in response to present knowledge of the existence of voice-traffic flow over the relay-UE's bearer communication path, rather than proactively based on an uncertain possibility that there might be a VoIP call at some point in the future. Therefore, this process could help to improve the donor base station's resource availability.

As the end-user UE's VoIP call proceeds, voice packets of that VoIP call could then flow over the relay-UE's dedicated QCI-1 VoIP relay bearer.

For instance, for each such packet that the conventional-gateway system 16 sends over the end-user UE's QCI-1 VoIP bearer to the end-user UE 40, the relay-gateway system 14 and donor base station 12 could read the DSCP 46 tag in the packet's header to determine that the packet is a voice packet. And considering that a QCI-1 VoIP relay bearer now exists between the PGW 26 and the relay-UE 34, the PGW 26, SGW 24, and donor base station 12 could route the packet over that QCI-1 VoIP relay bearer to the relay-UE 34, for transmission in turn the rest of the way the end-user UE 40.

And likewise, for each such packet that flows from the end-user UE 40 to the relay-UE 34, considering that a QCI-1 VoIP relay bearer now exists between the relay-UE 34 and the PGW 26 of the relay-gateway system 14, the relay-UE 34 could route the packet over that QCI-1 VoIP relay bearer to the donor base station 12 and in turn to the SGW 24 and the PGW 26, from where the packet could then flow along the remainder of the end-user UE's QCI-1 VoIP bearer to the PGW 30 of the conventional-gateway system.

Once the end-user UE's VoIP call ends, a similar process could also be used to release the relay-UE's dedicated QCI-1 VoIP relay bearer. By way of example, a similar entity could continue to monitor for the presence of voice traffic on the relay-UE's bearer communication path. And upon detecting the absence of such traffic for at least a predefined threshold long period of time that is deemed to indicate a likelihood that no VoIP call is being carried via the relay-UE's bearer communication path, the entity could responsively trigger release of the dedicated QCI-1 VoIP relay bearer with messaging similar to that discussed above but requesting release rather than setup of the bearer.

And optimally, this release of the relay-UE's dedicated QCI-1 VoIP relay bearer could in turn cause the donor base station 12 to release the resource-reservation that the donor base station 12 had imposed upon setup of the dedicated QCI-1 VoIP relay bearer, thereby again heling to improve the donor base station's resource availability.

As suggested above, while the above discussion has focused on VoIP communication, a similar process could be carried out with respect to other types of communication, having other types of dedicated relay bearers. Without limitation, for instance, a similar process could be carried out with respect to a conversational video communication, for which a dedicated QCI-2 relay bearer would be established and/or real-time gaming communication, for which a dedicated QCI-3 relay bearer would be established. As with the voice-traffic example above, these other dedicated relay bearers could likewise not be set up initially for the relay-UE 34, and then upon detecting (perhaps with different indicia than for voice) that there is an actual flow of conversational video or gaming traffic over the relay-UE's bearer communication path, an entity could responsively engage in similar signaling to trigger setup for the relay-UE of a dedicated relay bearer for carrying that traffic.

Figure 2:
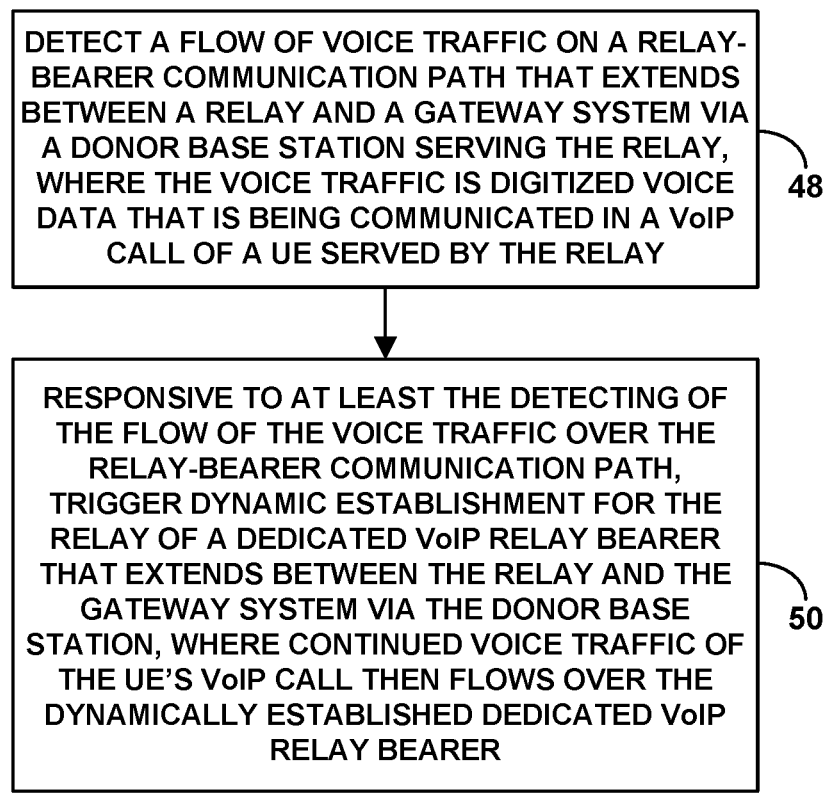
FIG. 2 is a flow chart depicting operations that can be carried out in accordance with the disclosure.

FIG. 2 is next a flow chart depicting an example method that can be carried out in accordance with the present disclosure, to control bearer establishment in a wireless communication system in which a donor base station serves a relay over a first air interface and in which the relay is configured to serve UEs over a second air interface.

As shown in FIG. 2, at block 48, the example method includes detecting a flow of voice traffic on a relay-bearer communication path that extends between the relay and a gateway system via the donor base station, where the voice traffic is digitized voice data that is being communicated in a VoIP call of a UE served by the relay. And at block 50, the method includes, responsive to at least the detecting of the flow of the voice traffic over the relay-bearer communication path, triggering dynamic establishment for the relay of a dedicated VoIP relay bearer that extends between the relay and the gateway system via the donor base station, where continued voice traffic of the UE's VoIP call then flows over the dynamically established dedicated VoIP relay bearer.

In line with the discussion above, the act of detecting the flow of the voice traffic on the relay-bearer communication path could involve detecting the flow of the voice traffic using deep packet inspection of one or more packets being communicated on the relay-bearer communication path, such as detecting RTP and/or DSCP data in one or more packet headers for instance.

Further, as discussed above, the relay could have a default relay bearer that extends between the relay and the gateway system via the donor base station, and the detected flow of the voice traffic could be on the default relay bearer. And in that case, the continued voice traffic of the UE's VoIP call could then flow over the dynamically established dedicated VoIP relay bearer rather than over the default relay bearer. For example, endpoints of the relay-bearer communication path could determine that the VoIP relay bearer exists and could therefore send the voice traffic on that VoIP relay bearer.

In addition, the gateway system could be a first gateway system (e.g., relay-gateway system) and, for the VoIP call, the UE could have a dedicated VoIP bearer that extends between the UE and a second gateway system (e.g., conventional-gateway system) via the relay, the donor base station, and the first gateway system. And in that case, the detected flow of the voice traffic could be on the UE's dedicated VoIP bearer.

As further discussed above, the relay could include a relay base station configured to serve the UEs over the second air interface and could further include a relay UE that is integrated or interfaced with the relay base station and that is served by the donor base station over the first air interface. And the act of detecting the flow of the voice traffic on the relay-bearer communication path could be done by the relay UE. Further, the dedicated VoIP relay bearer could extend between the relay UE and the gateway system via the donor base station, and wherein the act of triggering dynamic establishment for the relay of the dedicated VoIP relay bearer could involve the relay UE engaging in signaling that requests establishment of the dedicated VoIP relay bearer.

Alternatively, as discussed above, the act of detecting the flow of the voice traffic on the relay-bearer communication path could be done by the gateway system. And the act of triggering dynamic establishment for the relay of the dedicated VoIP relay bearer could involve the gateway system engaging in signaling that requests establishment of the dedicated VoIP relay bearer.

Still further, as discussed above, the method could additionally include (i) after the dynamic establishment for the relay of the dedicated VoIP relay bearer, detecting cessation of the flow of voice traffic on the relay-bearer communication path and (ii) responsive to at least detecting the cessation of the flow of voice traffic on the relay-bearer communication path, triggering release of the dedicated VoIP relay bearer.

Note also that various operations described herein could also take into consideration one or more additional factors, such as considerations of UE service levels, and network load, among other possibilities.

Figure 3:
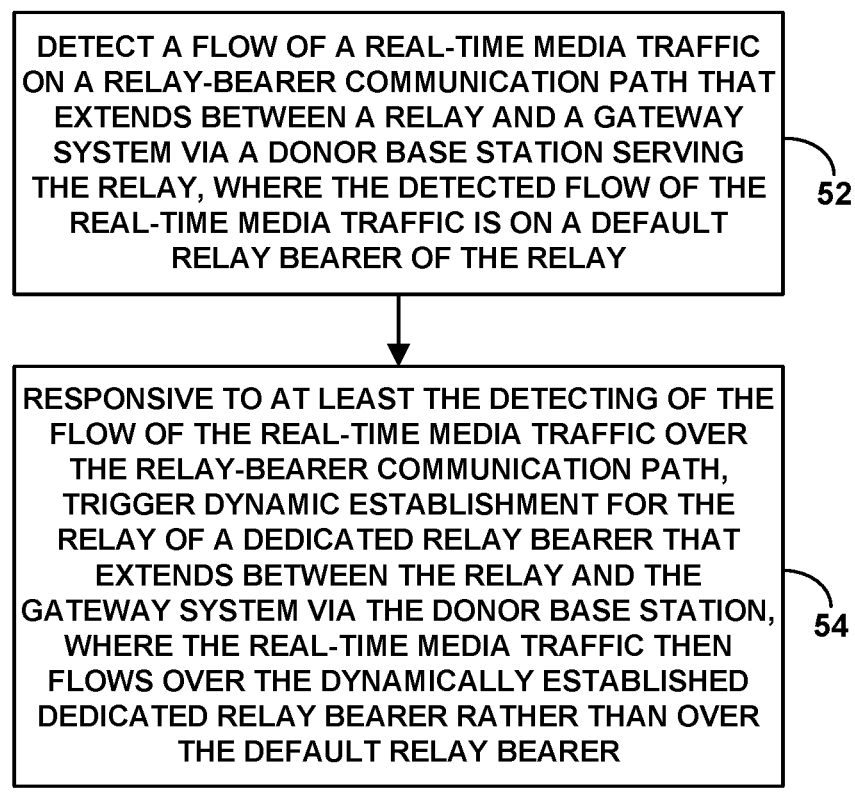
FIG. 3 is another flow chart depicting operations that can be carried out in accordance with the disclosure.

FIG. 3 is next another flow chart depicting a method that could be carried out in accordance with the present disclosure, to control bearer establishment in a wireless communication system in which a donor base station serves a relay over a first air-interface and in which the relay is configured to serve UEs over a second air interface, where the relay has a default relay bearer that extends between the relay and a gateway system via the donor base station.

As shown in FIG. 3, at block 52, the method could include detecting a flow of a real-time media traffic on a relay-bearer communication path that extends between the relay and a gateway system via the donor base station, where the detected flow of the real-time media traffic is on the default relay bearer. And at block 54, the method could include, responsive to at least the detecting of the flow of the real-time media traffic over the relay-bearer communication path, triggering dynamic establishment for the relay of a dedicated relay bearer that extends between the relay and the gateway system via the donor base station, wherein the real-time media traffic (e.g., continued real-time media traffic) then flows over the dynamically established dedicated relay bearer rather than over the default relay bearer.

In line with the discussion above, the real-time media traffic in this method could be of various types, examples of which include conversational voice, conversational video, and gaming. And the dedicated relay bearer dynamically established for the relay could have an associated QCI level.

Various features described herein can be implemented in this context as well, and vice versa.

Figure 4:
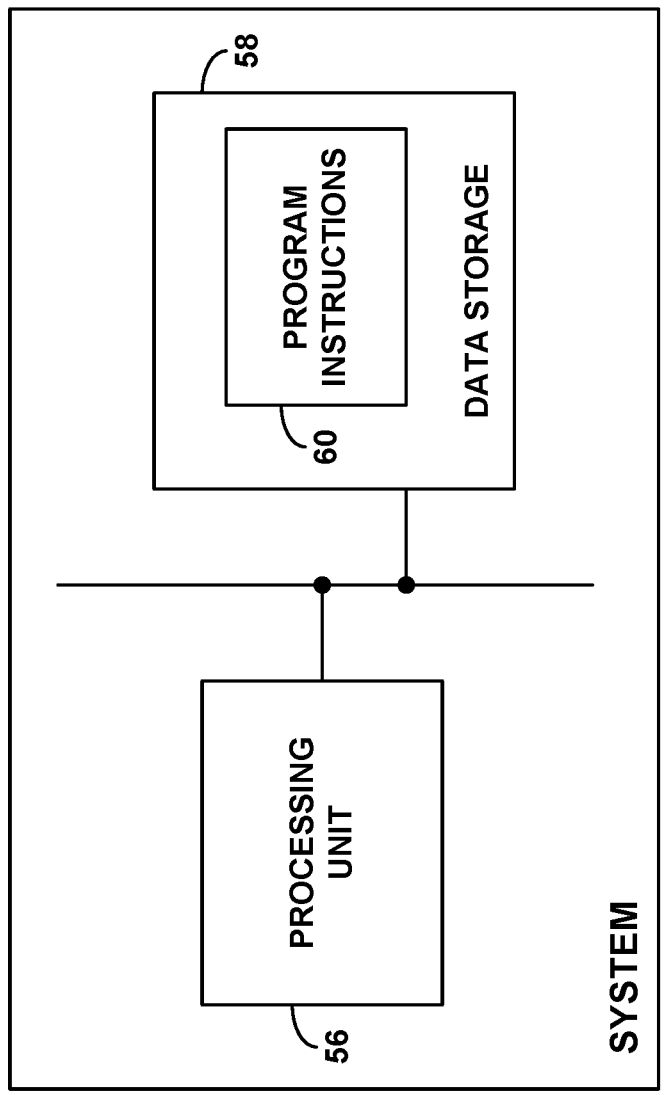
FIG. 4 is a simplified block diagram of a system operable in accordance with the disclosure.

FIG. 4 is next a simplified block diagram of a system arranged to control bearer establishment in a wireless communication system in which a donor base station serves a relay over a first air interface and in which the relay is configured to serve UEs over a second air interface. As shown in FIG. 4, the system includes at least one processing unit 56 (e.g., one or more microprocessors or other processors), at least one non-transitory data storage 58 (e.g., one or more volatile and/or non-volatile storage components, such as magnetic, optical, or flash storage), and program instructions 60 stored in the at least one non-transitory data storage and executable by the at least one processing unit to carry out various operations in line with the discussion above.

As discussed, this system could be embodied at and implemented by one or more components of various entities. For instance, the relay could include a relay UE and a relay base station, and the system could be embodied at the relay UE, in which case the triggering dynamic establishment for the relay of the dedicated VoIP relay bearer could involve causing the relay UE to engage in signaling that requests establishment of the dedicated VoIP relay bearer. Or the system could be embodied at the relay gateway system, in which case the triggering dynamic establishment for the relay of the dedicated VoIP relay bearer could involve causing the gateway system to engage in signaling that requests establishment of the dedicated VoIP relay bearer.

Various features described herein can also be implemented in this context as well, and vice versa.

The present disclosure also contemplates at least one computer readable medium having stored thereon (e.g., encoded with) program instructions executable by a processing unit to carry out various operations described herein.

Exemplary embodiments have been described above. Those skilled in the art will understand, however, that changes and modifications may be made to these embodiments without departing from the true scope and spirit of the invention.

What is claimed is:

1. A method for controlling bearer establishment in a wireless communication system, the method comprising:
    detecting a flow of voice traffic on a relay-bearer communication path that extends between a relay and a relay gateway system via a donor base station, wherein the voice traffic is digitized voice data being communicated in a voice-over-Internet-Protocol (VoIP) call of a user equipment (UE) served by the relay, wherein, for the VoIP call, the UE has a dedicated VoIP bearer that extends between the UE and a conventional gateway system via the relay, the donor base station, and the relay gateway system, the flow of the voice traffic being on the dedicated VoIP bearer; and
    responsive to at least the detecting of the flow of the voice traffic over the relay-bearer communication path, triggering dynamic establishment for the relay of a dedicated VoIP relay bearer that extends between the relay and the relay gateway system via the donor base station, wherein continued voice traffic of the VoIP call then flows over a dynamically established dedicated VoIP relay bearer.

2. The method of claim 1, wherein detecting the flow of the voice traffic on the relay-bearer communication path comprises detecting the flow of the voice traffic using deep packet inspection of one or more packets being communicated on the relay-bearer communication path.

3. The method of claim 1, wherein the relay has a default relay bearer that extends between the relay and the relay gateway system via the donor base station, and wherein the detected flow of the voice traffic is on the default relay bearer, wherein the continued voice traffic of the UE's VoIP call then flows over the dynamically established dedicated VoIP relay bearer rather than over the default relay bearer.

4. The method of claim 3, wherein the default relay bearer has a quality of service control indicator (QCI) of 6, and wherein the dedicated VoIP relay bearer has a QCI of 1.

5. The method of claim 1, wherein the relay comprises a relay base
    station configured to serve the UE over a second air interface and comprises a relay UE that is integrated or interfaced with the relay base station and that is served by the donor base station over a first air interface, and wherein detecting the flow of the voice traffic on the relay-bearer communication path is done by the relay UE.

6. The method of claim 5, wherein the dedicated VoIP relay bearer extends between the relay UE and the relay gateway system via the donor base station, and
    wherein triggering dynamic establishment for the relay of the dedicated VoIP relay bearer comprises the relay UE engaging in signaling that requests establishment of the dedicated VoIP relay bearer.

7. The method of claim 1, wherein detecting the flow of the voice traffic on the relay-bearer communication path is done by the relay gateway system.

8. The method of claim 7, wherein triggering dynamic establishment for the relay of the dedicated VoIP relay bearer comprises the relay gateway system engaging in signaling that requests establishment of the dedicated VoIP relay bearer.

9. The method of claim 1, further comprising:
    after the dynamic establishment for the relay of the dedicated VoIP relay bearer, detecting cessation of the flow of voice traffic on the relay-bearer communication path; and
    responsive to at least detecting the cessation of the flow of voice traffic on the relay-bearer communication path, triggering release of the dedicated VoIP relay bearer.

10. The method of claim 1, wherein the relay gateway system includes a packet-data network gateway (PGW) that communicates directly with a relay UE of the relay.

11. The method of claim 1, wherein the conventional gateway system includes a packet-data network gateway (PGW) that communicates directly with the UE.

12. A method for controlling bearer establishment in a wireless communication system, the method comprising: detecting a flow of a real-time media traffic on a relay-bearer communication path that extends between a relay and a relay gateway system via a donor base station, wherein the flow of the real-time media traffic is on a default relay bearer that extends between a user equipment (UE) and a conventional gateway system via the relay, the donor base station, and the relay gateway system; and responsive to at least the detecting of the flow of the real-time media traffic over the relay-bearer communication path, triggering dynamic establishment for the relay of a dedicated relay bearer that extends between the relay and the relay gateway system via the donor base station, wherein the real-time media traffic then flows over a dynamically established dedicated relay bearer rather than over the default relay bearer.

13. The method of claim 12, wherein the real-time media traffic is of a type selected from the group consisting of (i) conversational voice, (ii) conversational video, and (iii) gaming.

14. A system for controlling bearer establishment in a wireless communication system, the system comprising:
- at least one processing unit;
- at least one non-transitory data storage; and
- program instructions stored in the at least one non-transitory data storage and executable by the at least one processing unit to carry out operations including:
  - detecting a flow of voice traffic on a relay-bearer communication path that extends between a relay and a relay gateway system via a donor base station, wherein the voice traffic is digitized voice data being communicated in a voice-over-Internet-Protocol (VoIP) call of a user equipment (UE) served by the relay, wherein, for the VoIP call, the UE has a dedicated VoIP bearer that extends between the UE and a conventional gateway system via the relay, the donor base station, and the relay gateway system, the detected flow of the voice traffic being on the dedicated VoIP bearer, and
  - responsive to at least the detecting of the flow of the voice traffic over the relay-bearer communication path, triggering dynamic establishment for the relay of a dedicated VoIP relay bearer that extends between the relay and the relay gateway system via the donor base station, wherein continued voice traffic of a UE's VoIP call then flows over a dynamically established dedicated VoIP relay bearer.

15. The system of claim 14, wherein the relay has a default relay bearer that extends between the relay and the relay gateway system via the donor base station, and wherein the detected flow of the voice traffic is on the default relay bearer, wherein the continued voice traffic of the UE's VoIP call then flows over the dynamically established dedicated VoIP relay bearer rather than over the default relay bearer.

16. The system of claim 14, wherein the relay comprises a relay base station configured to serve the UE over a second air interface and comprises a relay UE that is integrated or interfaced with the relay base station and that is served by the donor base station over a first air interface, and wherein the system is embodied at the relay UE.

17. The system of claim 16, wherein the triggering dynamic establishment for the relay of the dedicated VoIP relay bearer comprises causing the relay UE to engage in signaling that requests establishment of the dedicated VoIP relay bearer.

18. The system of claim 14, wherein the system is embodied at the relay gateway system.

19. The system of claim 18, wherein triggering dynamic establishment
for the relay of the dedicated VoIP relay bearer comprises causing the relay gateway system to engage in signaling that requests establishment of the dedicated VoIP relay bearer.

20. The system of claim 14, wherein the operations further comprise: after the dynamic establishment for the relay of the dedicated VoIP relay bearer, detecting cessation of the flow of voice traffic on the relay-bearer communication path; and
responsive to at least detecting the cessation of the flow of voice traffic on the relay-bearer communication path, triggering release of the dedicated VoIP relay bearer.

* * * * *